May 10, 1955  B. M. DWORK  2,708,262
MICRO-WAVE MODULATOR
Filed March 6, 1948
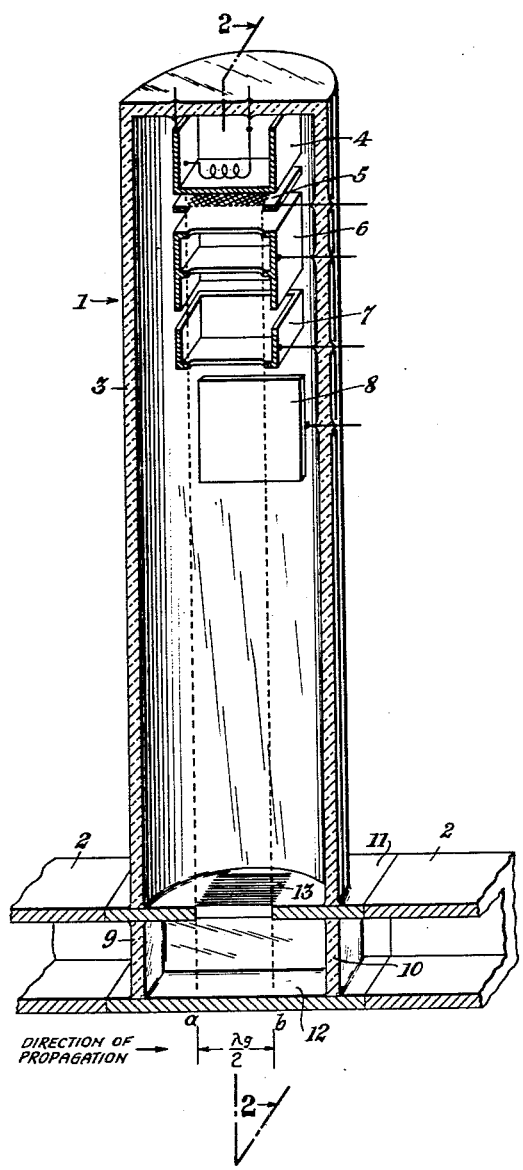
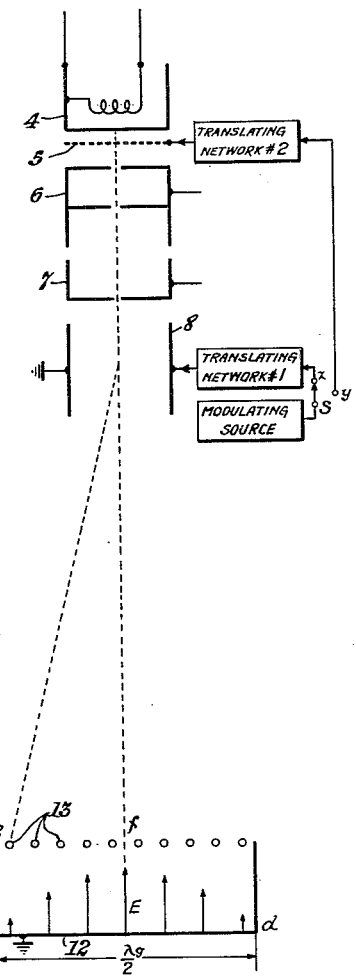
INVENTOR.
BERNARD M. DWORK
BY
ATTORNEY : 2,708,262
Patented May 10, 1955

2,708,262
MICRO-WAVE MODULATOR

Bernard M. Dwork, New York, N. Y., assignor to International Telephone and Telegraph Corporation, a corporation of Maryland Application March 6, 1948, Serial No. 13,480

6 Claims. (Cl. 332—58)

This invention relates to micro-wave modulator apparatus and more particularly to means for modulating ultra high frequency energy by control of the attenuation characteristic along a portion of a transmission medium provided for the propagation of such energy.

Heretofore, micro-wave modulation has usually been accomplished by electrically superimposing or associating modulation energy either directly with the micro-wave energy near its source or directly with the circuit parameters of the source itself.

It is an object of the present invention to provide for modulation of micro-waves through control of the local attenuation experienced by such waves along a given section of their transmission medium.

It is a further object of this invention to provide an electronic micro-wave modulator to be used in conjunction with micro-wave transmission systems to vary the dielectric characteristics or reflection property within a given portion thereof.

A still further object of this invention is to provide in conjunction with a waveguide a micro-wave modulator which will follow rapidly varying modulating signals and which will be usable over an entire band for the particular mode of operation employed in the guide.

Briefly, the modulator arrangement in accordance with the present invention comprises a section of micro-wave transmission line arranged to accommodate means for producing an electron sheet specially positioned with respect to the ultra high frequency fields set up along the line when micro-waves are propagated therethrough, the electron sheet-producing means including essentially rectangular shaped electrodes and means associated with the electron sheet for varying the current magnitude of said sheet or its position with respect to the fields present within the transmission line section.

The above-mentioned and other objects and features of this invention will become more apparent upon consideration of the following description of an embodiment of the invention taken in conjunction with the accompanying drawing, wherein:

Fig. 1 is a perspective view taken in section of a micro-wave modulator arrangement according to my invention; and Fig. 2 is a side view showing diagrammatically certain parts of the modulator structure taken along the line 2—2 of the device illustrated in Fig. 1. Also shown is the electric field distribution for one mode of operation.

Referring to Figures 1 and 2, the micro-wave modulator is shown to include an electron sheet-producing device indicated generally at 1. This may be a modified cathode ray tube arranged to fit snugly within a section of a micro-wave transmission medium such as the waveguide 2. To produce the desired electron sheet an electron gun is provided within the upper end of tube envelope 3, which gun comprises cathode 4 suitably heated, control grid 5, first accelerating and focusing anode 6 and second accelerating and focusing anide 7. These elements are to be essentially rectangular in shape instead of the conventional cylindrical type. The rectangular electrode 6 may be employed as the electron sheet-producing element within the gun structutre. Suitably positioned from the electrode 7 are deflection means which may comprise the electrostatic deflection system shown at 8. Of course magnetic deflection means may be employed if desired.

The base of the modulator device includes the dielectric boundary walls 9 and 10 preferably separated by a distance corresponding to more than $$\frac{\lambda g}{2}$$

in order to provide a fundamental electron sheet-accommodating length sufficient to insure proper impedance match between the micro-wave source and the modulator. In this connection a matching section or fixed attenuator may be placed between the micro-wave source and the modulating device. Walls 9 and 10 are effectively sandwiched between the two rectangular metal plates 11 and 12. The latter plates are machined so that they may be readily joined, as by brazing, to corresponding mating portions of wave guide 2. Metal plate 11 constitutes a window provided with a mesh or grill network consisting of parallel rods or strips which preferably have a length equal substantially to $$\frac{\lambda g}{2}$$

Plate 11, plate 12 and a dielectric walls 9 and 10 form an evacuated walled-in portion within which region over the area defined by distances $ab$ and $cd$ the electron sheet will operate. If desired a Leonard window may be provided in plate 11. The metal plate 12 serves both as a lower base plate for the modulator device and as a continuous conductive means for connecting adjoining lower base surfaces of the wave guide 2. An electron collector plate (not shown) which is held at a suitable potential with respect to the cathode 4 may be placed adjacent to or in base 12 if desired.

The direction with respect to the longitudinal dimension of the wave guide of the electron sheet and that of the strips 13 will of course depend on the particular mode of operation utilized within the wave guide. Referring to Fig. 2 in the example illustrated the $TE_{01}$ mode is shown. The vectors E represent the instantaneous distribution of the electric field within the waveguide. The electron sheet is shown parallel to the electric field and also parallel to the direction of propagation. It can be seen that for $TE_{01}$ operation the width $cd$ of the waveguide should correspond substantially to a half wavelength in the guide at the operating frequency. A preferred modulations means for controlling the attenuation along the distance $ab$ in the waveguide is to deflect the electron sheet so as to move it transversely over this distance $cd$. For other TE modes of operation the transverse distance through which the deflected sheet is moved should again be restricted to cover a distance corresponding substantially to a half wavelength in the guide at the operating frequency. It should be noted further in connection with Fig. 2 that with switch S in position $x$ a translating network is interposed between the deflection system 8 and the source of modulating-voltage. The reason for this provision will soon become apparent.

The operation of the modulator according to the present invention may be described as follows. The electron stream emitted from the cathode 4 is accelerated by the first anode and focusing electrode 6, its rectangular construction permitting the formation of a thin electron sheet. The electron sheet is further accelerated while retaining its shape through the action of electrode 7. As the sheet falls within the influence of the electrostatic field established between plates 8 with switch S in position $x$ it is subject to deflection in accordance with the potentials applied to such plates. When no deflection voltage is applied to plates 8 the electron sheet enters the waveguide window in a central position as indicated at point $f$. Since the sheet is parallel to the R. F. electric field and to the direction of energy propagation it effects a maximum change in the dielectric constant and thus the reflection in the guide along the section $ab$. Thus the transfer property of the section with respect to R. F. energy propagated therethrough will be altered. Thus by varying the deflection of the electron sheet its position within the guide may be altered on either side of the medium point $f$ to provide a controlled range of attenuation. If the length $ab$ of the electron sheet is sufficiently large, any desired variation in attenuation can be obtained. In order to insure a linear response between deflection voltage and attenuation a suitable non-linear translating network may be interposed between the modulating source and the deflection system. It is to be understood that the parallel rods or strips 13 are shown in diagrammatic form and no attempt has been made to show their actual number or thickness. Actually they constitute very thin wires whose primary function is to effectively guide and retain the electric field within the waveguide section $ab$.

An alternate scheme for varying the attenuation in the waveguide involves controlling the magnitude of the current in the electron sheet in accordance with applied modulating voltages. Using the same device described in connection with Figures 1 and 2, switch S is turned to position $y$ thereby connecting the modulating source, through the translating network 2 if desired, to the control grid 5. The voltage on the deflecting plate is fixed while the modulating voltage is applied to the control electrode.

While I have shown and described the principles of my invention with regard to the transverse electric, TE, mode of operation it will be understood that the basic principals of my invention apply equally as well to the transverse magnetic, TM, mode of operation. Also the transmission means employed may be, for example, of the concentric line type. The direction of the electron sheet with respect to the dimension of the guide may be altered or the sheet may be replaced by an electron beam formed into a different shape or pattern to meet specific operational problems. The direction and character of the window strips may be similarly altered for different modes of operation. It is clearly understood, therefore, that the illustrations herein shown and described are given by way of example only and not as a limitation to the scope of my invention:

I claim:

1. In a micro-wave modulator arrangement, the combination which includes a waveguide having a normal attenuation, a modulating source, an ultra high frequency modulating device including envelope means composed of a dielectric material, electron gun means positioned within said envelope at one end thereof, said electron gun means comprising elements of substantially rectangular shape for providing an electron sheet at an end of said device remote from said one end, means disposed adjacent said electron gun means and responsive to said modulating source to alter a characteristic of said electron sheet, a sheet-receiving window sealed to said envelope near said remote end, a base member arranged adjacent said window having a base surface with two opposing sides perpendicular thereto and arranged to be joined with said window forming a box-like base structure having two open portions on opposite sides thereof, said open portions being enclosed by walls of dielectric material, and means for interposing said box-like structure in said waveguide in aligned and sealed relation thereto whereby said box-like structure forms an intermediate continuous section of said waveguide.

2. A microwave modulator arrangement according to claim 1 in which said window is provided with parallel strips disposed parallel to the direction of micro-wave propagation, and said electron sheet is arranged to pass through said window parallel to the direction of microwave propagation and to the electric field established within said waveguide with said mode of operation.

3. A microwave modulator arrangement according to claim 2 in which said electron sheet-altering means comprise electron sheet-deflecting means arranged to move said electron sheet in a direction transverse to said direction of propagation.

4. A micro-wave modulator arrangement according to claim 3 further comprising non-linear translating means interposed between said modulating source and said sheet-deflecting means.

5. A system comprising a source of electromagnetic waves, means forming a restricted path along which said waves are propagated, the propagation of said waves being of a mode such that the electric field distribution crosswise of said path is a maximum along the center longitudinal axis of said path decreasing in intensity laterally thereof means for projecting an electron beam across a portion of said path in a direction transverse to the direction of propagation of said waves but parallel to the lines of force of said electric field so that the waves pass through said beam, a source of modulating voltages, and means responsive to said modulating voltages for deflecting said beam cross-wise of said path in accordance with the intensity of said modulating voltages, said deflection being in directions laterally with respect to said center longitudinal axis.

6. A system according to claim 5 wherein said projecting means includes an electron emissive cathode and an electron gun composed of substantially rectangular elements to produce said beam in the form of a sheet said electrodes being disposed to produce said sheet of electrons with the larger dimension of a cross-section thereof parallel to said path.

References Cited in the file of this patent

UNITED STATES PATENTS

| | | |
|---|---|---|
| 2,368,031 | Llewellyn | Jan. 23, 1945 |
| 2,394,008 | Pierce | Feb. 5, 1946 |
| 2,418,735 | Strutt et al. | Apr. 8, 1947 |
| 2,444,060 | Ohl | June 29, 1948 |
| 2,447,543 | Sullin | Aug. 24, 1948 |
| 2,457,601 | Ring | Dec. 28, 1948 |
| 2,464,115 | Bull | Mar. 8, 1949 |
| 2,505,557 | Lyman | Apr. 25, 1950 |
| 2,542,182 | Crump | Feb. 20, 1951 |